No. 644,864. Patented Mar. 6, 1900.
B. G. LAMME.
ELECTROMOTIVE FORCE REGULATION.
(Application filed Oct. 6, 1898.)

(No Model.)

WITNESSES:

INVENTOR
Benjamin G. Lamme
BY
ATTORNEY.

UNITED STATES PATENT OFFICE.

BENJAMIN G. LAMME, OF PITTSBURG, PENNSYLVANIA, ASSIGNOR TO THE WESTINGHOUSE ELECTRIC AND MANUFACTURING COMPANY, OF PENNSYLVANIA.

ELECTROMOTIVE-FORCE REGULATION.

SPECIFICATION forming part of Letters Patent No. 644,864, dated March 6, 1900.

Application filed October 6, 1898. Serial No. 692,797. (No model.)

*To all whom it may concern:*

Be it known that I, BENJAMIN G. LAMME, a citizen of the United States, residing in Pittsburg, in the county of Allegheny and State of Pennsylvania, have invented a new and useful Improvement in Electromotive-Force Regulation, (Case No. 793,) of which the following is a specification.

My invention relates to electromotive-force regulation; and it has for its object to provide an efficient means for use in connection with a generator that is liable to supply a variable line electromotive force by reason of variable speed or otherwise in order to secure an approximately constant line electromotive force.

It is well known that the satisfactory operation of translating devices in parallel demands an approximately constant line electromotive force or one that increases to a limited degree with an increase of load in order to overcome the drop in the line. It is therefore generally considered necessary to operate the generator or generators at constant speed or at a speed as nearly constant as may be secured by proper regulation of the prime mover. Where the prime mover is a steam or gas engine, such regulation may be approximated under ordinary conditions, but where a water-wheel is employed for driving the generator the regulation necessary for securing constant speed of the generator is either impossible or is approximated only with great difficulty and under the most favorable conditions.

In view of the difficulties attending the attempted speed regulation of the main generator by regulating the speed of its driving-motor, except in so far as such regulation may be conveniently and roughly effected, I propose to regulate the line electromotive force by automatically adjusting the field-magnet excitation in accordance with changes in speed or in accordance with such other variations as tend to make the line electromotive force variable. In order to effect this regulation, I have devised the apparatus illustrated in the accompanying drawings, in which—

Figure 1:
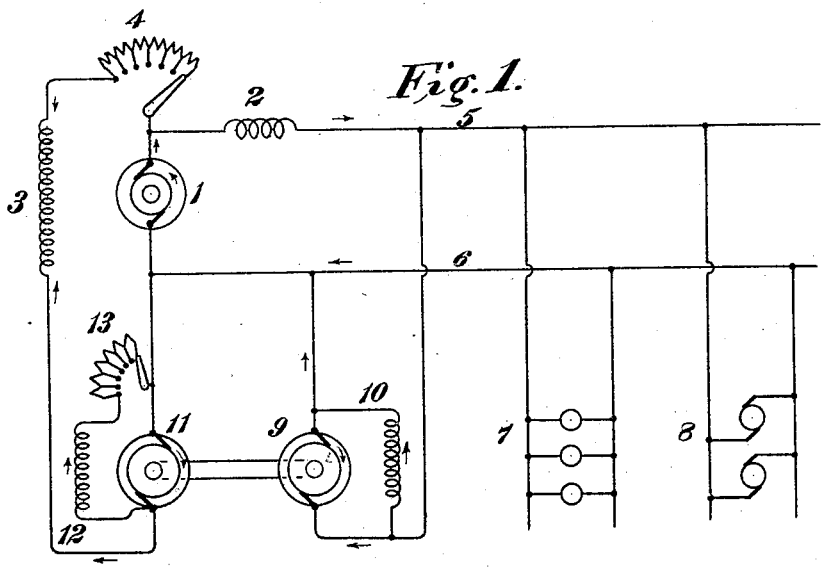
Figure 2:
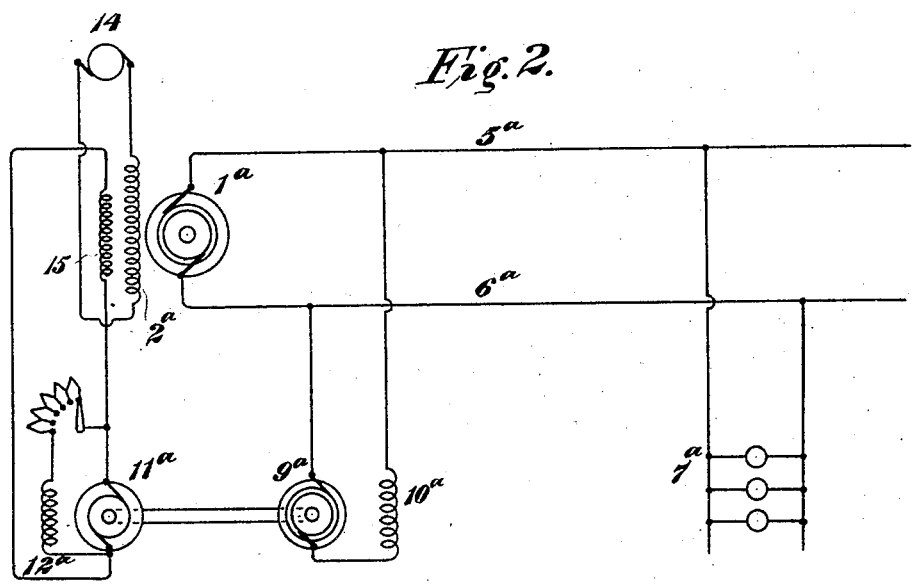

Figure 1 is a diagram of the machines and circuits embodied in a direct-current constant-electromotive-force system, the prime mover being omitted, however, since it may be of any known type and either directly connected or belted to the armature-shaft of the generator. Fig. 2 is a similar diagram of an alternating-current system.

Referring now to Fig. 1, I have shown the generator 1 as provided with a series field-magnet winding 2 and a shunt field-magnet winding 3, this being the preferred form, although the series winding may be omitted, if desired. The conditions may also be such as to make it feasible to separately excite the field-magnet, either in whole or in part. I have shown a variable resistance 4 in the shunt-circuit in order that such circuit may be primarily adjusted for the conditions of operation in any given system, but no adjustment of this resistance is contemplated or will ordinarily be necessary for the purpose of securing the desired regulation after it has been primarily adjusted for the particular system in which the machine is to be utilized.

The line-circuit 5 6, supplied by the generator 1, may be utilized for the operation of any translating devices adapted to the line voltage. I have shown lamps 7 and motors 8 as indicative of such translating devices.

9 is a small motor connected across the circuit 5 6 and provided with a shunt field-magnet winding 10. This type of winding is shown as indicative of what is believed to be the preferred form, although it is not desired or intended to limit the invention to this particular form of motor, a series winding, a compound winding, and a separately-excited winding being within the scope of the invention. The relation between the field-magnet core and its winding should be such, however, that the former is maintained at the point of saturation or approximately at that point at all times during the operation of the system. In case the machine 1 is an alternating-current generator a series field-magnet winding for the motor 9 would probably be most desirable; but for a direct-current system a shunt or a separately-excited winding would be more desirable for this motor.

The armature of the motor 9 is mechanically connected to the armature of a small generator 11. This connection may be made by means of belt and pulleys, by mounting the two armatures upon a single shaft, or by either a flexible or rigid coupling between the shafts of the two machines, all of these means being well known in the art. In view of the greater simplicity it will probably be advisable to couple the armatures directly and rigidly instead of by means of a belt and pulleys. The generator 11 is shown as provided with a shunt field-magnet winding 12, in the circuit of which is a variable resistance, this resistance being primarily adjusted to secure the results desired, but is not intended to be adjusted during the operation of the machine, the regulating effect being secured automatically. A series field-magnet winding may also be employed in connection with the shunt-winding, if desired; but the latter will probably be found sufficient in all or most cases. The relation between the winding and its core is such that in normal operation the magnetic condition of the latter is much below saturation. The armature of the generator 11 is connected in series with the shunt-winding 3 of the generator 1, and the motor 9 is so connected and driven that the electromotive force impressed by the generator 11 upon the shunt-circuit of the machine 1 is in opposition to that impressed upon such circuit by the last-named generator. If a separately-excited main generator be employed, the armature of generator 11 may be connected in series with the field-magnet winding of generator 1 and its exciter, so as to act in opposition to the latter. Since the line electromotive force is adjusted by adjusting the excitation of the field-magnet of generator 1, this adjustment of excitation or magnetization may be effected by providing a separate opposition winding for the opposing electromotive force supplied by the generator 11 instead of opposing the normal electromotive force directly in the same winding, as will be readily understood.

It will be understood from the foregoing description in connection with the drawings that on account of the saturated field of the motor 9 the motor will respond immediately to any change in the electromotive force of the circuit 5 6, whether due to a change in speed of the generator 1 or to any other cause. The change in speed of the motor 9, due to such change in electromotive force, effects a corresponding change in the speed of the armature of generator 11, and since the field of the latter is working below saturation a change in its speed will instantly effect a change in its field-magnet magnetization, and consequently a change in the electromotive force impressed by it upon the field-magnet circuit of generator 1, with which it is connected. If the variable resistances 4 and 13 have been properly adjusted, this opposing electromotive force supplied by generator 11 will bear such a relation to the magnetizing electromotive force otherwise applied to the field-magnet of the generator 1 that the line electromotive force will be kept approximately constant. This regulation will probably not be so close as to absolutely eliminate all fluctuations; but the percentage of increase and decrease may be made so small as to be unimportant so far as the operation of the translating devices is concerned.

In Fig. 2 I have shown an alternating-current generator $1^a$, having a field-magnet winding $2^a$, supplied with direct current by a suitable exciter 14. The motor $9^a$ has a series field-magnet winding $10^a$ and is connected across the main circuit $5^a$ $6^a$, which supplies translating devices $7^a$. The generator $11^a$ is constructed to operate the same as generator 11, (shown in Fig. 1,) but has its armature electrically connected to a winding 15 on the field-magnet of generator $1^a$, so as to oppose the action of the winding $2^a$. The mode of operation and result are substantially the same as in the system shown in Fig. 1.

I claim as my invention—

1. Means for regulating the electromotive force of a circuit supplied by a generator which tends to give a variable electromotive force, comprising a motor driven by current from said circuit and a compensating generator having a shunt-wound field-magnet and having its armature mechanically connected to the armature of said motor and electrically connected to a field-magnet winding of the main generator so as to exert a magnetizing effect in opposition to that exerted by the normal magnetizing-current.

2. Means for regulating the electromotive force of a circuit supplied by a variable-speed generator comprising a motor driven by current from said circuit, and a compensating generator having a field-magnet provided with a shunt-winding and having its armature mechanically connected to the armature of said motor and electrically connected in series with a magnetizing-circuit for the main generator so as to oppose the electromotive force otherwise impressed upon such magnetizing-circuit.

3. In a system of electrical distribution, the combination with a main generator which tends to give a variable electromotive force and a compensating generator having a shunt-wound field-magnet worked below magnetic saturation and an armature electrically connected to a field-magnet winding of the main generator, of a motor driven by current derived from the main circuit and having a saturated field-magnet and an armature mechanically connected to the compensating generator so as to drive the same in opposition to the main generator.

4. In a system of direct-current electrical distribution, the combination with a compound-wound generator, of a shunt-wound compensating generator having a normally-unsaturated field-magnet and having its armature connected to a field-magnet winding of the main generator, and a shunt-wound motor driven by current derived from the main circuit and mechanically connected to the compensating generator so that the current supplied by the latter to the field-magnet winding of the main generator shall act in opposition to the normal magnetizing-current, the field-magnet of said motor being normally saturated.

5. In a system of direct-current electrical distribution, the combination with a variable-speed generator having a shunt field-magnet winding, of a shunt-wound compensating generator having a normally-unsaturated field-magnet and having its armature connected in series with the shunt-winding of the main generator, and a motor driven by current derived from the main circuit and mechanically connected to the compensating generator so that the current supplied by the latter to the shunt-winding of the main generator shall oppose its normal current, the field-magnet of said motor being normally saturated.

In testimony whereof I have hereunto subscribed my name this 5th day of October, 1898.

BENJ. G. LAMME.

Witnesses:
 WESLEY G. CARR,
 H. C. TENER.